July 19, 1966          W. E. BRUCKER          3,261,434

BRAKE ADJUSTER

Filed June 22, 1964          2 Sheets-Sheet 1

INVENTOR.
WILLIAM E. BRUCKER
BY
Sheldon F. Raizes
ATTORNEY

July 19, 1966  W. E. BRUCKER  3,261,434
BRAKE ADJUSTER
Filed June 22, 1964   2 Sheets-Sheet 2
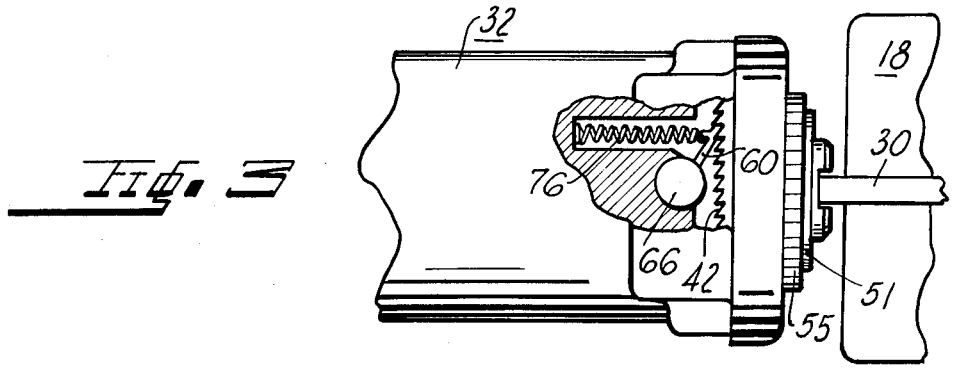
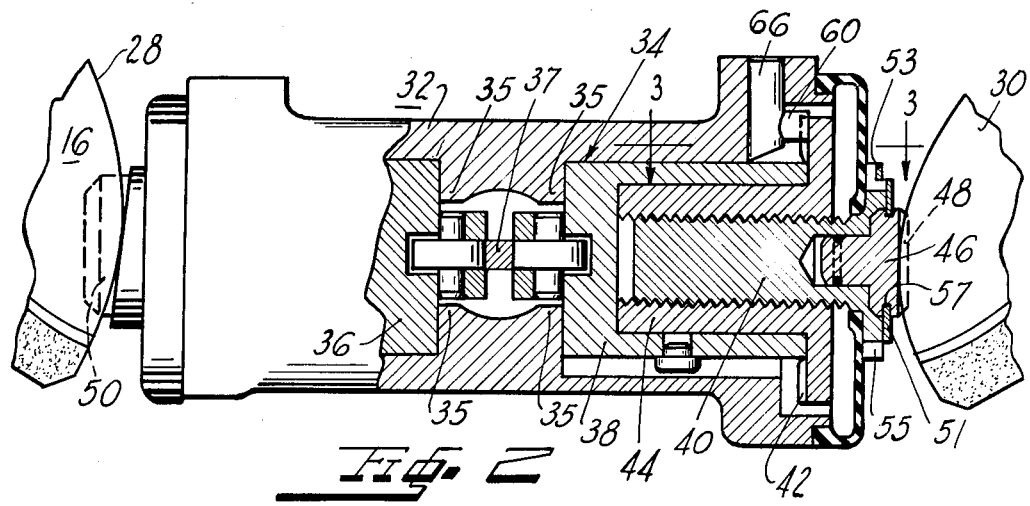
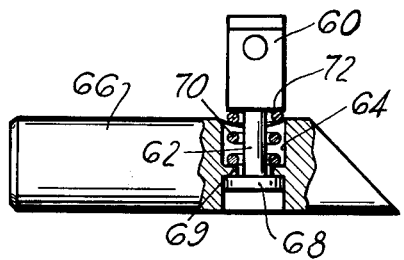
INVENTOR.
WILLIAM E. BRUCKER
BY
Sheldon F. Raizes
ATTORNEY

United States Patent Office 3,261,434
Patented July 19, 1966

3,261,434
BRAKE ADJUSTER
William E. Brucker, South Bend, Ind., assignor to The Bendix Corporation, South Bend, Ind., a corporation of Indiana
Filed June 22, 1964, Ser. No. 376,732
5 Claims. (Cl. 188—196)

This invention relates to an automatic adjuster for brakes and is intended to be an improvement on the concept disclosed in U.S. Serial No. 381,268, filed July 8, 1964 (common assignee).

More particularly, the invention concerns an automatic adjuster for a brake comprising a rotatable adjuster nut having teeth thereon, a non-rotatable adjuster screw fixed to a brake shoe and threadedly connected to the adjuster nut, and pawl means engaging the teeth to rotate the adjuster nut relative to the adjuster screw during return of the adjuster screw and the adjuster nut, as a unit, to released position for effecting longitudinal movement of the adjuster screw.

It has been found that under certain conditions during brake actuation the adjuster screw and the adjuster nut are forced as a unit toward their released position by forces acting on their respective brake shoe. This is called "kickback." Due to the load exerted on the adjuster screw and the adjuster nut during brake actuation, the adjuster nut is not free to rotate relatively to the adjuster screw, in response to the rotational force exerted thereon by the pawl, during "kickback" condition and thus, either the pawl or the ratchet teeth are damaged during "kickback" condition.

Accordingly, it is an object of this invention to provide an automatic adjuster with means compensating for "kickback" condition to prevent damage to the adjusting mechanism during this condition.

Another object of this invention is to construct an adjuster of the type described above which provides relative slidable movement between the pawl and a pivotal pin on which it is carried to compensate for "kickback."

Still another object of the invention is to construct the "kickback" compensating means so the adjuster is operable at all times when the "kickback" condition has subsided.

Other objects of the invention will become apparent from the following description with reference to the drawings, wherein:

FIGURE 2 is a front section view of the actuator and adjusting mechanism of the brake assembly of FIGURE 1, which are illustrated in shoe retracted position;

FIGURE 3 is a partial section view taken along section line 3—3 of FIGURE 2; and FIGURE 4 is a view of the pawl and pin assembly.

Figure 1:
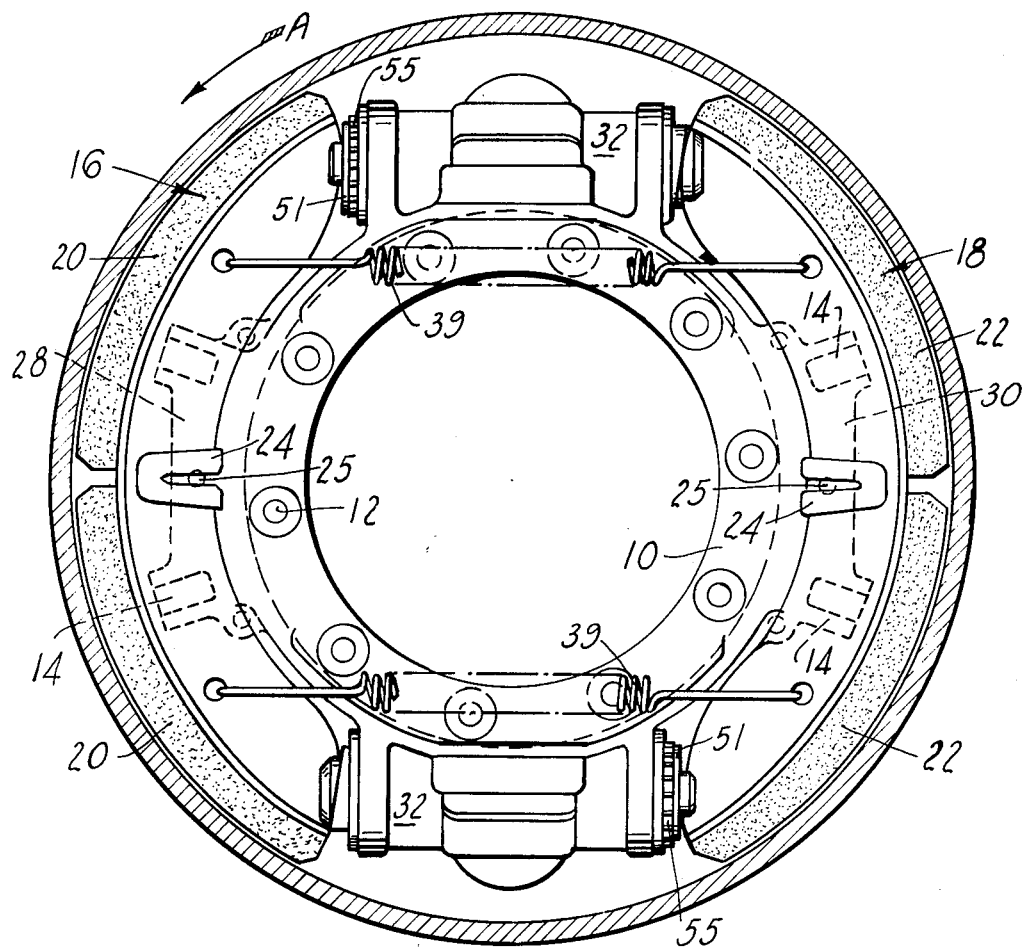
FIGURE 1 is a front elevational view of the brake assembly.

Referring to FIGURE 1, the brake assembly illustrated therein has a torque spider 10 which is adapted to be mounted on a stationary part of a vehicle, such as an axle flange, by inserting bolts (not shown) through the circumferentially spaced holes 12. The torque spider has supporting ledges 14 for slidably supporting a pair of T-shaped brake shoes 16 and 18, having friction linings 20 and 22, respectively. A pair of hold-down springs 24 are each mounted to the torque spider by bolts 25 and each has a finger engaging the webs 28 and 30 of the brake shoes 16 and 18, respectively, for biasing the shoes against the supporting ledges 14. The torque spider also has a pair of diametrically opposed cylinder housings 32 formed integrally therewith, each of which contains a slidable plunger assembly 34 and a plunger 36. A pair of anchor flanges 35 are located within each cylinder housing. The plunger assembly 34 and plunger 36 each abut the anchor flanges 35 during released position and one of the plunger or plunger assembly anchor on the anchor flanges 35 during braking depending upon the direction of drum rotation. The plunger assembly 34 and the plunger 36 are spread apart by a wedge member 37 which may be of any well known arrangement such as illustrated in U.S. Patent No. 2,527,126 issued to Goepfrich. A pair of shoe-to-shoe return springs 39 return the shoes and thereby the plungers to released position.

The plunger assembly 34 comprises a hollow sleeve 38, an adjuster nut 40 carrying ratchet teeth 42 thereon, and an adjuster screw 44. The adjuster nut 40 has a hollow interior, the sidewalls of which are threaded for rotatably receiving the adjuster screw 44, which is T-shaped in cross section. A stud 46 is secured to the adjuster screw 44 for relative rotation therewith and has a slot 48 which slidingly receives one end of its respective brake shoe. The plunger 36 has a slot 50 at its outer end for slidably receiving one end of its respective brake shoe.

A spring clip 51 having a depending flange 53 disposed within one of a plurality of notches 55 on the outer periphery of the adjuster screw 44 has a central opening 57 with a plurality of flats which mate with flats on the stud 46 to prevent relative rotation between the stud 46 and the clip 51. Since the web 30 of the shoe 18 is disposed within the slot 48, rotation of the stud is prevented by the shoe and, therefore, rotation of the adjuster screw 44 is normally prevented since the clip 51 is unable to rotate. However, upon applying a tool to the notched periphery 55 of the screw 44, the screw 44 may be turned with the flange 53 slipping out of the notches during manual turning of the screw 44 to effect manual adjustment.

A pawl 60 is provided and has a stem 62 extending through an opening 44 in a pin 66 which is pivotally mounted on the housing 32. A head 68 is provided at the end of the stem 62 for engaging a countersunk annular shoulder 69 in the opening 64. A spring 70 is compressed between the annular shoulder 69 on the pin 66 and an annular shoulder 72 on the pawl 60 to bias the pawl in a direction away from the axis of the pin. Engagement of the head 68 with the countersunk shoulder 69 fixes the normal operative position of the pawl 60 on the pin 66. The end of the pawl is biased by a spring 76 into engagement with the teeth 42. The relationship between the pawl 60 and the teeth 42 is such that upon return of the plunger assembly to the brake released position, the pawl will effect a rotational force on the adjuster nut 40 tending to rotate the same in a clockwise direction. The force of the spring 70 is such that upon normal return movement of the plunger assembly, the pawl will remain in its normal operating position relative to the pin and pivots with the pin in a direction toward the housing. If the force exerted by the adjuster nut 40 on the pawl 60 is greater than the force of the spring 70, then relative slidable movement will occur between the pawl 60 and the pin 66 against the force of the spring 70.

*Operation*

In operation, assuming rotation of a brake drum in the direction of arrow A, actuation of the wedge 37 will spread apart the plunger assembly 34 and the plunger 36 with the shoes 16 and 18 anchoring on the flanges 35 through the plungers 36. The pawl 60 is urged by the spring 76 and pivots with pin 66 to follow the axial movement of the teeth 42 away from the housing. If the plunger assembly 34 has moved a predetermined distance in a brake actuating direction, then the pawl 60 will pick up a new tooth and upon release of the actuating pressure on the wedge, the return springs 39 will return the plunger assembly 34 to its normally released position against the anchoring flanges 35. During the return stroke of the plunger assembly 34 to its released position, the pawl 60 will be pivoted back in a direction toward the housing, thereby exerting a clockwise rotational force on the adjuster nut 40, thus extending the adjuster screw 44 in an axial direction a given amount effecting automatic adjustment of the brake.

However, there is a condition which is known as "kickback" wherein the brake shoe, which is actuated by the plunger assembly 34, is thrust in a direction toward the brake released position during brake application. When "kickback" condition occurs, the plunger assembly 34 is being forced toward its normally released position and thus is forcing the pawl 60 to pivot in a direction toward the housing, with the pawl thus imparting a clockwise rotational force on the adjuster nut 40. However, there is too much friction between the threads on the adjuster screw 44 and the threads on the adjuster nut 40 to permit relative rotation therebetween. Since the pawl 60 is unable to pivot toward the housing in its normal operating position relative to the pin 66, the adjuster nut 40 effects sliding of the pawl 60 relative to the pin 66 against the force of the spring 70 while simultaneously pivoting the pin 66. If the "kickback" condition subsides during brake application, the adjuster nut 40 will be thrust outward again, and the pawl 60 will be thrust in a direction away from the housing 32 by the spring 70 to assume its normal operating position on the pin 66. Assuming that the braking pressure is released and thereby terminates the "kickback" condition while the plunger assembly 34 is between its released position and its fully applied position, the return spring 39 will retract the shoes to urge the plunger assembly 34 the remaining distance of its return stroke to normally released position. Since the braking pressure is released, the adjuster nut 40 is free to rotate, thus allowing the pawl 60 and pin 66 to be pivoted by axial movement of the adjuster nut 40 to effect simultaneous rotation of the adjuster nut in accordance with the remaining distance of the return stroke. As a further phase of the adjustment, the spring 70 thrusts the pawl 60 in a direction away from the housing thus effecting rotation of the adjuster nut 40 until pawl 60 assumes its normal operating position on the pin 66. In this instance, the adjuster screw 44 is additionally extended in accordance to the return stroke distance the plunger assembly was thrust during "kickback" condition.

It can be seen that the resilient spring 70 serves two purposes: (1) permitting overtravel and absorption of the forces exerted by the adjuster nut 40 on the pawl 60 during "kickback" condition, and (2) it also effects rotation of the adjuster nut to conform with the automatic adjustment dictated by the pawl when the "kickback" condition terminates upon brake release.

Numerous adaptations of the invention will be obvious to those skilled in the art. It is my intention to include within the scope of the following claims all equivalent applications of the invention whereby the same or substantially the same results may be obtained.

I claim:

1. In a brake: a housing member, a bore in said housing member, a plunger assembly mounted in said bore for slidable movement relative to said housing member in a brake applying direction and a return direction, said plunger assembly comprising a non-rotatable threaded member and a rotatable member threadedly secured to said non-rotatable member and having teeth thereon, pawl means, said pawl means being operatively connected to said housing member for pivotal movement into engagement with said teeth, resilient means urging said pawl means into engagement with said teeth, said pawl means being arranged relative to said teeth to effect a rotational force on said rotatable member upon return movement of said plunger assembly, the operative connection of said pawl means to said housing including resilient means separate from said first named resilient means urging said pawl means into a normal operating position relative to said housing, whereby upon normal return movement of said plunger assembly said pawl means will maintain its normal operating position relative to said housing while being pivoted by said rotatable member and thereby imparting a rotational force on said rotatable member and upon return movement of said plunger assembly caused by "kickback," said pawl means will be shifted from its normal operating position relative to said housing against the force of said second named resilient means.

2. In a brake: a housing member, a bore in said housing member, a plunger assembly mounted in said bore for slidable movement relative to said housing member in a brake applying direction and a return direction, said plunger assembly comprising a non-rotatable threaded member and a rotatable member threadedly secured to said non-rotatable member and having teeth thereon, pawl means, said pawl means being operatively connected to said housing member for pivotal movement into engagement with said teeth, resilient means urging said pawl means into engagement with said teeth, said pawl means being arranged relative to said teeth to effect a rotational force on said rotatable member upon return movement of said plunger assembly, the operative connection of said pawl means to said housing including resilient means separate from said first named resilient means urging said pawl means into a normal operating position relative to its pivotal axis, whereby upon normal return movement of said plunger assembly said pawl means will maintain its normal operating position relative to its pivotal axis while being pivoted by said rotatable member and thereby imparting a rotational force on said rotatable member and upon return movement of said plunger assembly caused by "kickback," said pawl means will be shifted from its normal operating position relative to its pivotal axis against the force of said second named resilient means.

3. The structure as recited in claim 2 wherein said second named resilient means urges said pawl means in a direction transverse to said pivotal axis and said pawl means shifts in a direction transverse to said pivotal axis during "kickback."

4. In a brake: a housing member, a bore in said housing member, a plunger assembly mounted in said bore for slidable movement relative to said housing member in a brake applying direction and a return direction, said plunger assembly comprising a non-rotatable threaded member and a rotatable member threadedly secured to said non-rotatable member and having teeth thereon, a pin rotatably mounted on said housing, a pawl slidably mounted on said pin for slidable movement transverse to the axis of said pin, stop means on said pin defining the normal position of said pawl on said pin, resilient means urging said pawl means into engagement with said stop means, said pawl being arranged for engagement with said teeth, said pawl being arranged relative to said teeth to effect a rotation force on said rotatable member upon return movement of said plunger assembly, whereby upon normal return movement of said plunger assembly said pawl will maintain its normal operating position relative to said pin while being pivoted by said rotatable member and thereby imparting a rotational force on said rotatable member and upon return movement of said plunger assembly caused by "kickback," said pawl will be shifted from its normal operating position on said pin against the force of said resilient means.

5. In a brake: a housing member, a bore in said housing member, a plunger assembly mounted in said bore for slidable movement relative to said housing member in a brake applying direction and a return direction, said plunger assembly comprising a non-rotatable threaded member and a rotatable member threadedly secured to said non-rotatable member and having teeth thereon, a pin rotatably mounted on said housing, an opening in said pin extending transversely to the axis of said pin, an element comprising a pawl at one end and a stem at the other end extending into said opening, stop means located on said pin and in said opening, abutments means located on said stem for engagement with said stop means thereby defining the normal position of said pawl on said pin, said element having a shoulder at the juncture of said stem and pawl, a shoulder in said opening, a spring surrounding said stem and located in said opening, said spring being compressed between said shoulders for urging said abutment into engagement with said stop means, said pawl being arranged for engagement with said teeth, said pawl being arranged relative to said teeth to effect a rotational force on said rotatable member upon return movement of said plunger assembly, whereby upon normal return movement of said plunger assembly said pawl will maintain its normal operating position relative to said pin while being pivoted by said rotatable member and thereby imparting a rotational force on said rotatable member and upon return movement of said plunger assembly caused by "kickback" said pawl will be shifted from its normal operating position relative to said pin against the force of said spring.

References Cited by the Examiner

UNITED STATES PATENTS 3,068,964  12/1962  Williams et al. _____ 188—79.5

DUANE A. REGER, *Primary Examiner.*